United States Patent [19]
Winskye

[11] Patent Number: 5,951,079
[45] Date of Patent: Sep. 14, 1999

[54] SANDBAG SHOVEL

[76] Inventor: Richard W. Winskye, P.O. Box 8094, Tucson, Ariz. 85725

[21] Appl. No.: 09/062,846

[22] Filed: Apr. 20, 1998

Related U.S. Application Data

[60] Provisional application No. 60/061,738, Oct. 11, 1997.

[51] Int. Cl.$^6$ .............................. A01B 1/00; B65B 67/12
[52] U.S. Cl. ................................ 294/55; 141/108; 294/58
[58] Field of Search ............................. 294/1.1, 1.3, 1.4, 294/49, 51, 55, 57–59; 15/257.1, 257.3, 257.4; 53/255, 390; 141/10, 108, 109, 114, 314, 316, 390, 391; 206/223; 248/95, 97, 99–101; D8/10

[56] References Cited

U.S. PATENT DOCUMENTS

| | | |
|---|---|---|
| 96,941 | 11/1869 | McPhail . |
| 1,182,412 | 5/1916 | Olesberg ............................... 294/55 X |
| 1,558,368 | 10/1925 | Jones . |
| 1,796,288 | 3/1931 | Hester . |
| 1,882,931 | 10/1932 | Rodriquez . |
| 1,923,816 | 8/1933 | Firl . |
| 1,983,815 | 12/1934 | Schmiett ............................... 294/49 X |
| 2,305,863 | 12/1942 | Ginter . |
| 2,455,729 | 12/1948 | Byers . |
| 4,052,764 | 10/1977 | Groff ...................................... 15/257.9 |
| 4,664,348 | 5/1987 | Corsaut, III et al. ...................... 248/99 |
| 4,669,689 | 6/1987 | Jones ......................................... 248/99 |
| 4,881,706 | 11/1989 | Sedlik ....................................... 248/99 |
| 5,107,666 | 4/1992 | Rahtican ............................... 294/55 X |
| 5,205,107 | 4/1993 | Herink .................................. 294/55 X |
| 5,308,027 | 5/1994 | Fullilove ................................ 248/101 |
| 5,395,147 | 3/1995 | Brown et al. ............................. 294/55 |
| 5,549,540 | 8/1996 | Moore et al. ............................. 494/20 |
| 5,575,315 | 11/1996 | Wengert ............................... 294/55 X |
| 5,673,734 | 10/1997 | Hawley ................................. 294/55 X |

*Primary Examiner*—Johnny D. Cherry
*Attorney, Agent, or Firm*—Halvorson & Verable, P.C.

[57] ABSTRACT

The present invention is a shovel that is adapted to quickly and efficiently fill containers, such as bags, with loose materials, such as sand or gravel. The shovel has a main body with a pair of handles located on first and second sides of the body, respectively. The body is preferably seven-sided and made by taking a piece of material and removing three of its four corner points. The seven-sided body has two long edges that meet at first ends, respectively, to form a single acute point. The acute point on this shovel allows the user to gain access to compacted or frozen materials that otherwise might be a problem to collect. Second ends of the two long edges meet first ends of two short edges, respectively, forming a first pair of obtuse points. Second ends of the two short edges meet first ends of two medium edges, respectively, forming a second pair of obtuse points. Second ends of the medium edges meet opposite ends of a third short edge, respectively, thereby forming a third pair of obtuse points. The body is then bent or folded along several fold lines to create a scoop form. A first pair of fold lines extends substantially parallel to the two shortest edges and approximately one fifth of the body width from each edge, respectively. A second pair of fold lines extends from the third pair of obtuse points to approximately 3 inches from the single acute point, measured across the diagonal.

11 Claims, 6 Drawing Sheets

SANDBAG SHOVEL

This application claims the benefit of U.S. Provisional Application entitled "One-Person Bag-Filling Tool", filed Oct. 11, 1997 Ser. No. 60/061,738.

FIELD OF THE INVENTION

The present invention relates to the field of container filling devices. More specifically, the present invention relates to shovel-type devices adapted to fill containers with loose materials.

BACKGROUND

Severe weather conditions frequently create conditions in which a supply of readily available fortification materials, such as sandbags, is desirable. Flood conditions, and the like, especially create a need for a large supply of sandbags.

Currently, and in the past, the primary method for filling sandbags is for two people to fill the bag: one person holds the bag open while the remaining person fills the bag with loose materials, such as sand. Typically, a garden-variety shovel is used to fill the bags. This type of shovel is designed more to turn earth than to fill open containers. Thus, during the process of filling bags, a significant amount of loose material frequently misses the bag opening and falls to the ground. This "lost" material is a huge waste of time and energy. Thus, there is a need for a device that will reduce the amount of material "lost" during the bag filling operation.

Furthermore, since the typically used shovel has a small pan, extra time and effort is needed to adequately fill a bag. Using the current process, the filling of sandbags can require up to ten or more shovel-loads of loose material. Thus, it is obvious that there is a need for a device that will accelerate the bag filling operation, thereby allowing more bags to be filled in an equivalent amount of time. Additionally, the extra work required to be performed in the filling operation thereby creates extra and unnecessary fatigue. Thus, there is also a need for a device that is adapted to efficiently fill open containers thereby reducing the amount of wasted work performed during the filling operation.

In the past there have been several attempts to address these and other problems. One broad category is simply a device that is designed to hold bags open. This category is exampled by U.S. Pat. No. 96,941 issued to McPhail, U.S. Pat. No. 1,558,368 issued to Jones, U.S. Pat. No. 1,796,288 issued to Hester, U.S. Pat. No. 1,882,931 issued to Rodriguez, U.S. Pat. No. 1,923,816 issued to Firl, U.S. Pat. No. 2,305,863 issued to Ginter, U.S. Pat. No. 2,455,729 issued to Byers, U.S. Pat. No. 4,664,348 issued to Corsaut, III et al., U.S. Pat. No. 4,669,689 issued to Jones, and U.S. Pat. No. 4,881,706 issued to Sedlik. These devices all basically replace the individual currently used to hold open the bag. The amount of materials directed into the bag and the amount of effort required to fill the bag remain unchanged.

Another category of devices is what appears to be a combination "dust pan" and bag opener. This category is exampled by U.S. Pat. No. 5,308,027 to Fullilove and U.S. Pat. No. 4,052,764 to Groff. These patents disclose devices designed to hold open a bag and to further provide a ramp or scoop or "dust pan" type attachment that is adapted to help direct small objects or refuse into the bag. These devices teach their use with simple brooms or other common cleaning equipment. While these devices appear to be designed to be used by a single individual, they are held in one hand while the other hand uses the broom other equipment. These patents do not, however, address the need for quick and efficient filling of containers by a single individual.

SUMMARY OF THE INVENTION

It is an object of the present invention to provide a device that allows a single person to fill bags with loose materials, such as sand.

It is another object of the present invention to provide a device that easily fills an attached bag with loose materials.

It is a further object of the present invention to provide a bag-filling device that funnels loose material into the open tops of bags or other containers.

It is yet another object of the present invention to provide a sandbag filling shovel that is adapted to be operable by a single person. The shovel is substantially funnel-shaped with a pointed digging end, two handles attached to opposite sides of the shovel and an open bag-filling end. Further, the shovel may have hook portions to which bags may be removably attached for easy and convenient single person filling.

It is still another object of the present invention to provide a shovel that has a scoop-shaped body and a pair of handles located on first and second sides, thereof It is still a further object of the present invention to provide a scoop shaped shovel body with a pointed front end, a pair of handles attached to first and second sides, and a truncated rear end, said shovel adapted to work in combination with containers, such as bags, bucket, boxes or the like.

It is still yet a further object of the present invention to include hooks with the handles, said hooks adapted to hold bags, into which the truncated rear end of the shovel is inserted.

It is another object of the present invention to provide a shovel adapted to collect light weight loose material, said shovel being scoop shaped with a flat front end, two sides having handles attached thereon, and a truncated rear end adapted to work with containers.

It is a further object of the present invention to provide attachments for the above shovel, including a sleeve that extends between the shovel and the container and that guides the loose material from the shovel into the container.

It is still yet another object of the present invention to provide a handle extension attachment that, when attached to the shovel, allows the shovel of the present invention to be used in a conventional manner, said handle extension having a handle portion with a rear handle attached to a first end and a front handle attached to a second end and a pair of attachment portions projecting from the second end at an angle from the handle portion. Securing mechanisms are further attached to distal ends of each of the attachment portions, said securing mechanisms adapted to secure the handle extension to the shovel.

BRIEF DESCRIPTION OF THE DRAWINGS

The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with the accompanying drawings wherein:

DESCRIPTION OF PREFERRED EMBODIMENTS

The present invention is a tool that is useful for quickly and easily filling bags or other containers with loose materials. These containers are frequently used in the establishment of retaining walls that prevent erosion or the intrusion of water into certain areas. Sand, in most cases, will be the preferred loose material used to fill the containers.

The present invention is designed to be used by a single person who can fill approximately 50% more bags in an hour than two people using the conventional system: e.g., one person holding a bag while the other person fills the bag with a shovel. This same two person team using the tool of the present invention would be able to fill approximately three times as many bags per hour, a 300% increase in efficiency. Due to the physical design of this tool, there is a substantial reduction in strength required for operation that substantially reduces fatigue thereby increasing labor efficiency.

Figure 1:
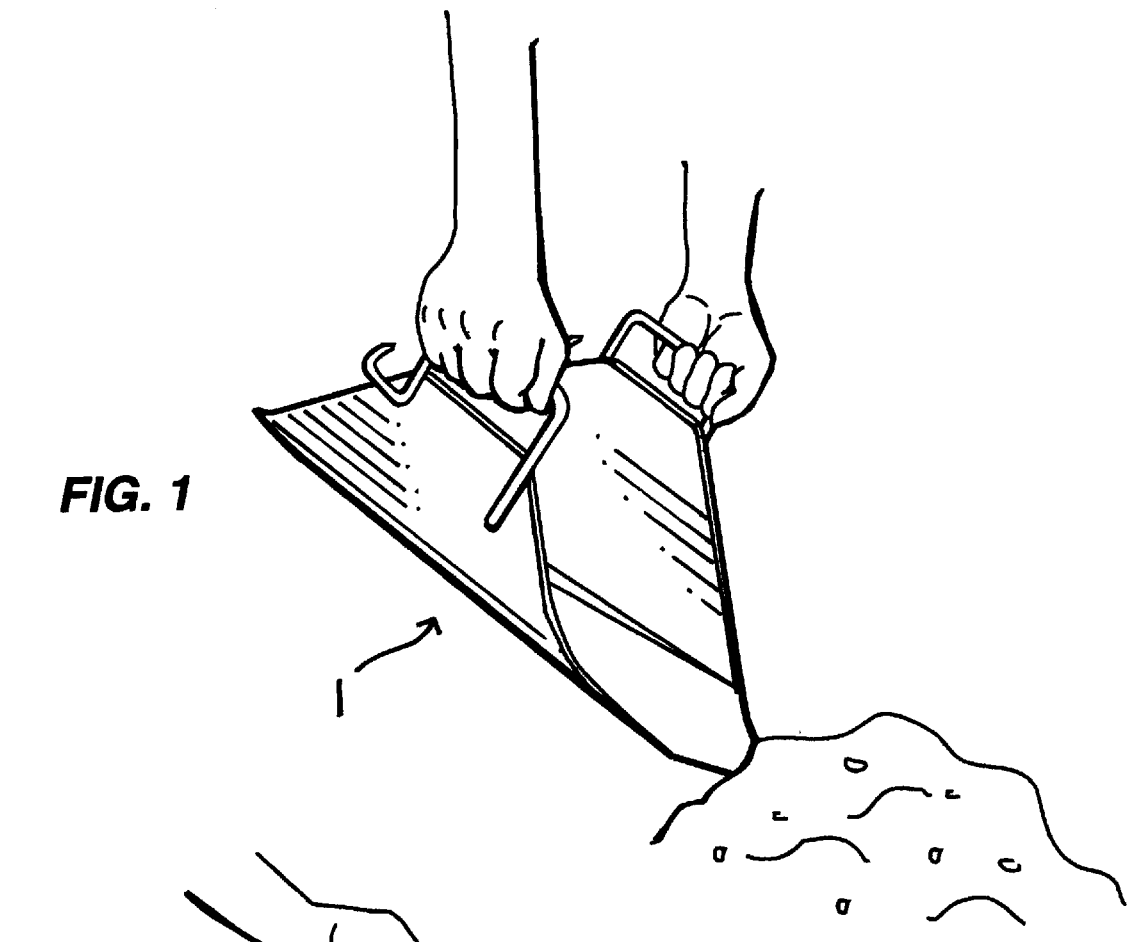
FIG. 1 illustrates how the present invention is used to scoop loose materials.
Figure 2:
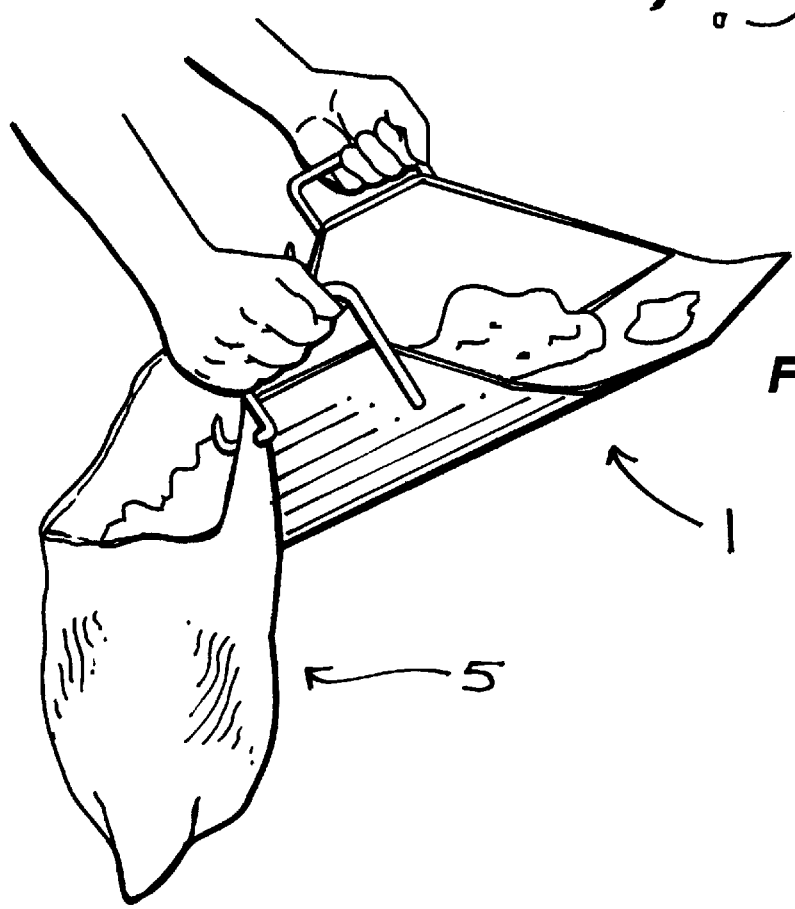
FIG. 2 illustrates how the present invention is used to fill a container, such as a bag, with loose materials.
Figure 3:
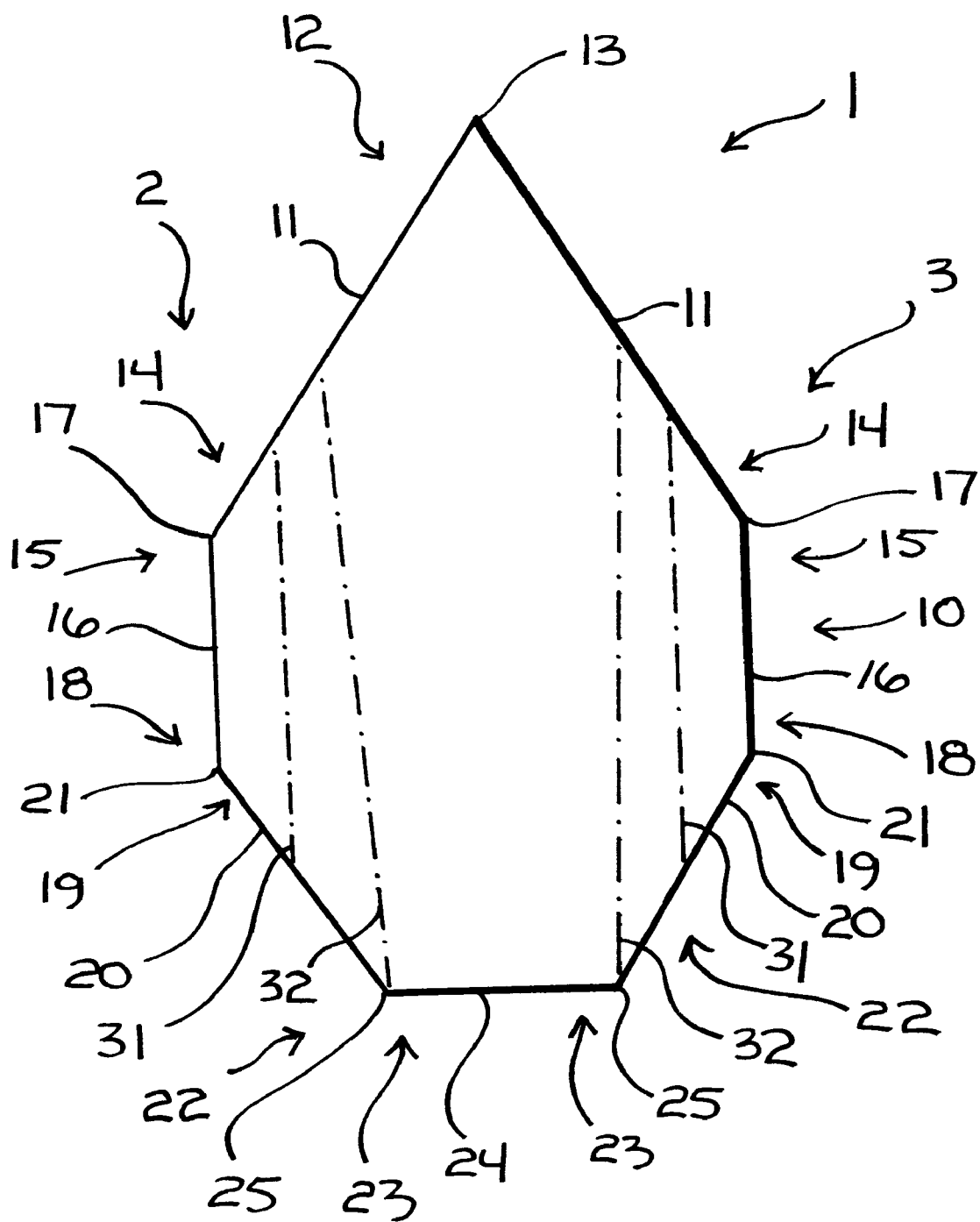
FIG. 3 is a top view of the body of the seven sided embodiment of the present invention, dashed lines are fold lines and are for illustration purposes only.
Figure 4:
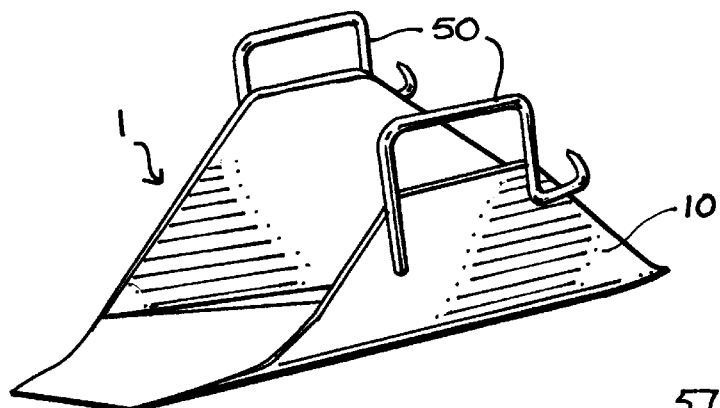
FIG. 4 is a perspective view of the present invention.
Figure 5:
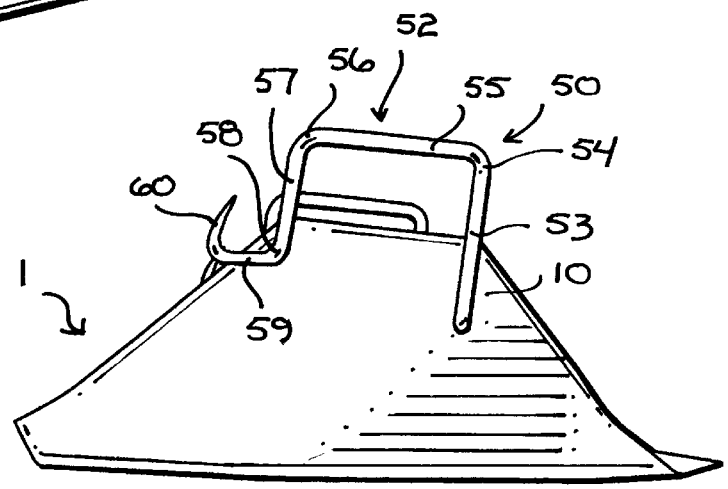
FIG. 5 is a side view of the present invention.
Figure 6:
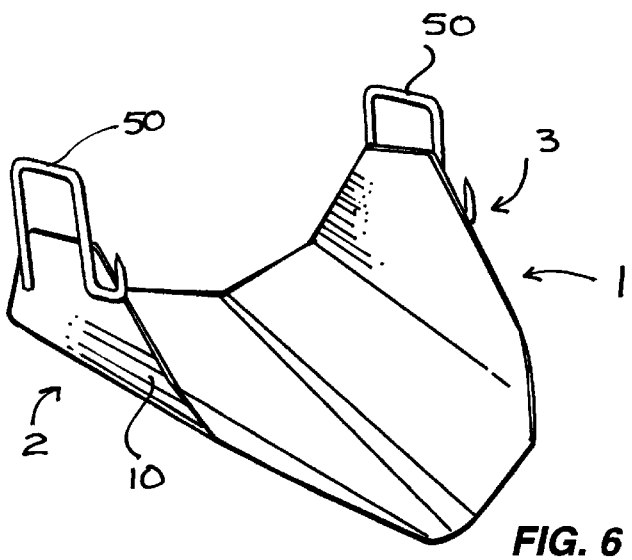
FIG. 6 is a second perspective view of the present invention.
Figure 7:
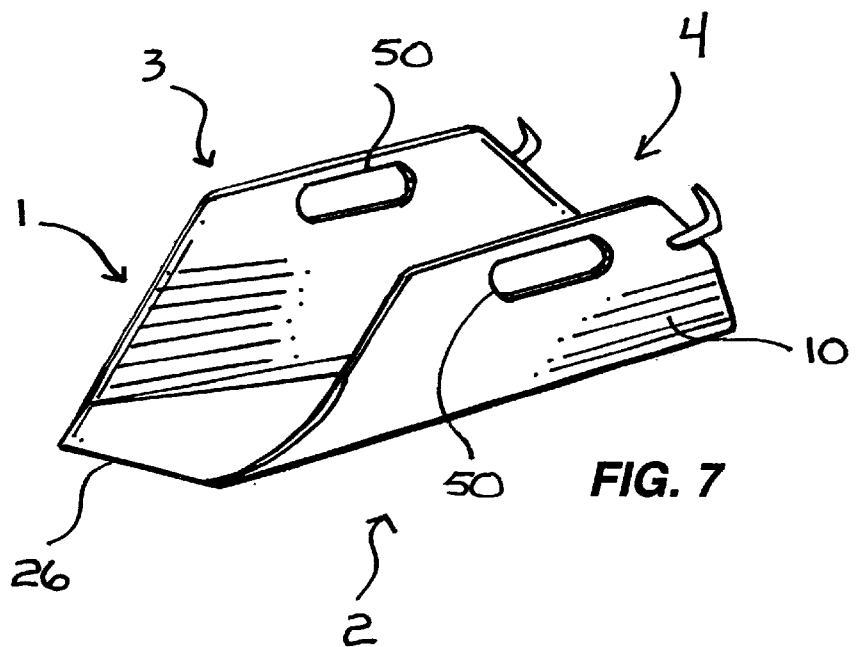
FIG. 7 is a perspective view of an alternate embodiment of the present invention.
Figure 8:
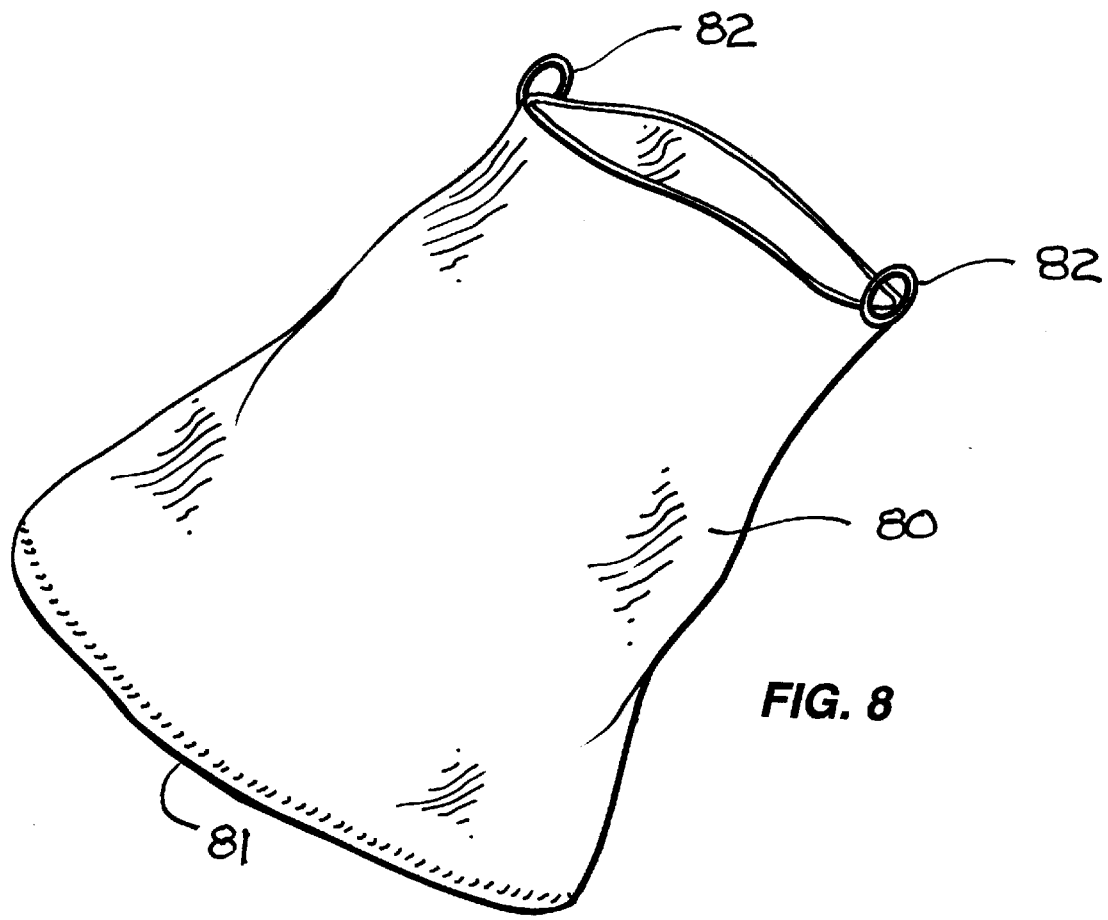
FIG. 8 is a fill-sleeve with attachment rings designed for use with the present invention.
Figure 9:
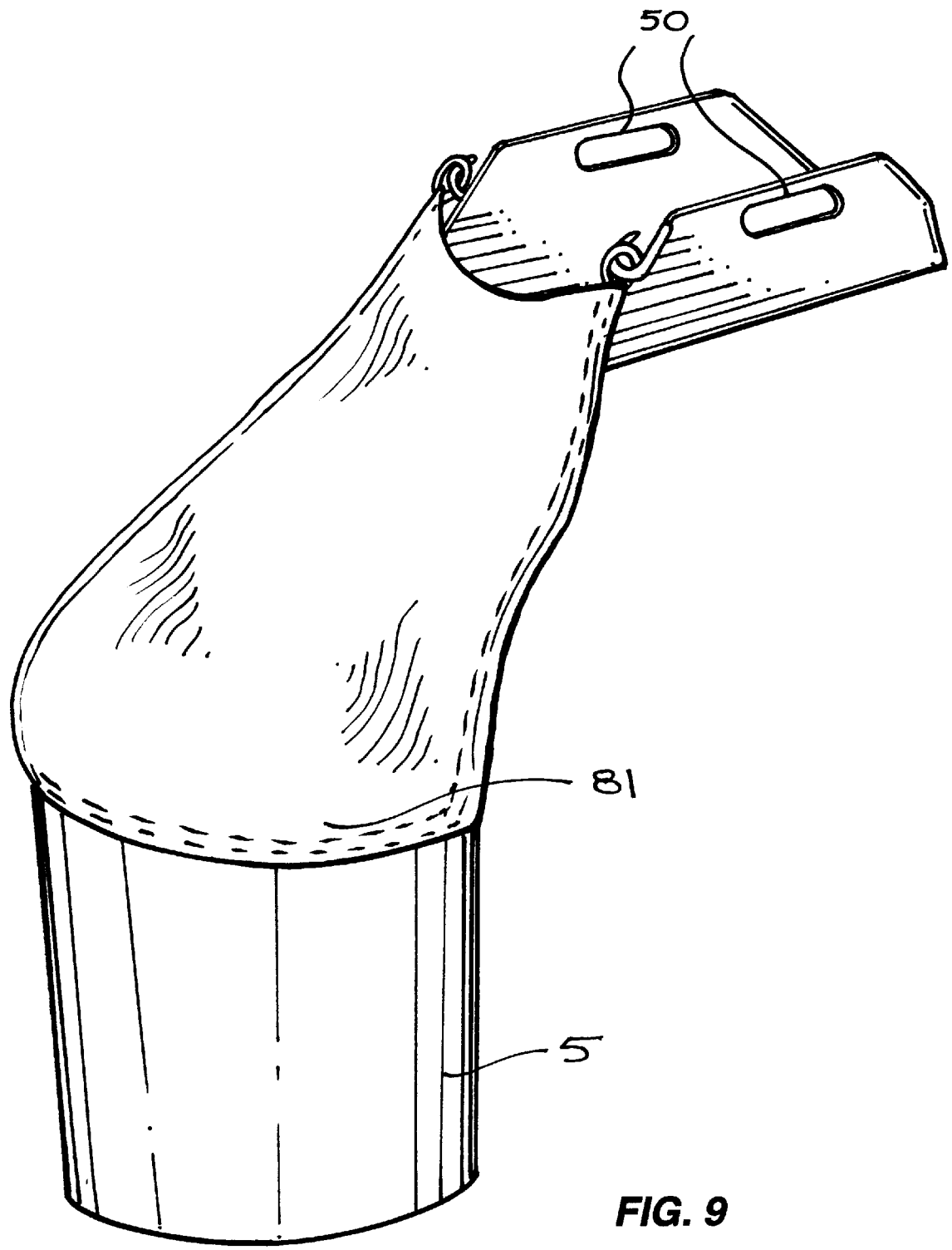
FIG. 9 shows the fill-sleeve is used with the present invention to fill a container, such as a bucket, with loose materials.
Figure 10:
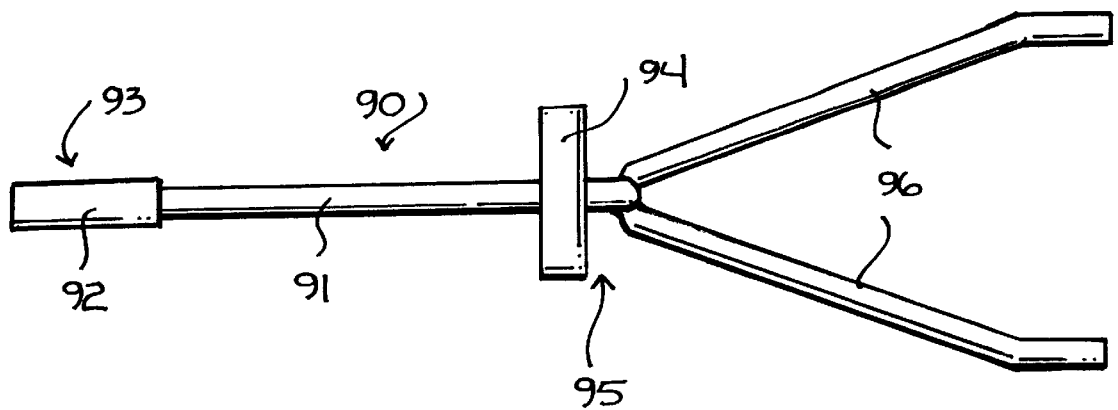
FIG. 10 is a top view of an extension handle designed for use with the present invention.
Figure 11:
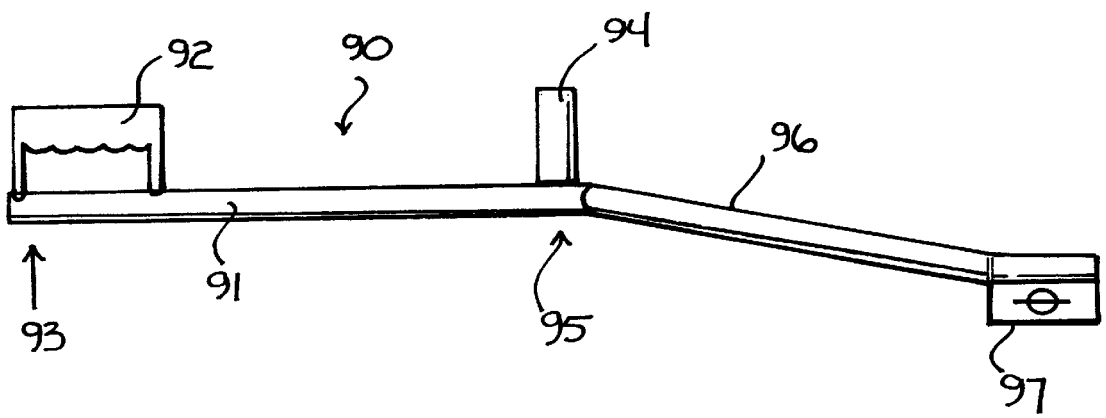
FIG. 11 is a side view of an extension handle designed for use with the present invention.

The present invention is a tool or shovel 1 having a main body 10 with a pair of handles 50 located on first and second sides, 2 and 3 of the body 10, respectively. The body 10 is preferably seven-sided and made by taking a 16 inches square piece of material, such as 16 gauge steel, and removing three of its four corner points. The seven-sided body 10 has two long edges 11 that meet at first ends 12, respectively, to form a single acute point 13. The acute point 13 on this shovel 1 allows the user to gain access to compacted or frozen materials that otherwise might be a problem to collect. Second ends 14 of the two long edges 11 meet first ends 15 of two short edges 16, respectively, forming a first pair of obtuse points 17. Second ends 18 of the two short edges 16 meet first ends 19 of two medium edges 20, respectively, forming a second pair of obtuse points 21. Second ends 22 of the medium edges 20 meet opposite ends 23 of a third short edge 24, respectively, thereby forming a third pair of obtuse points 25, see FIG. 3. The corner shearing cuts that create the shortest edges 16 are preferably made 2 inches in from the point to be cut-off, based on a measurement taken across the diagonal. This, therefore, makes the length of the shortest edges 16 respectively, approximately 2.8 inches long. The third short edge 24 is preferably located diagonally across from the single acute point 13. The third short edge 24 is preferably 3 inches in from the point based on a measurement taken across the diagonal. This, therefore, makes the length of the third shortest edge 24 approximately 4.25 inches long.

The body 10 is then bent or folded along several fold lines to create a scoop form. A first pair of fold lines 31 extends substantially parallel to the two shortest edges 16 and approximately one fifth of the body width from each edge 16, respectively. A second pair of fold lines 32 extends from the third pair of obtuse points 25 to approximately 3 inches from the single acute point 13, measured across the diagonal. These fold lines, 31 and 32, may be inscribed onto the body or they may be figurative lines illustrating the position of appropriate bends. While a variety of fold angles may be used to create the scoop shape of the shovel, in the preferred embodiment, the body is bent along these lines at approximately a 45 degree angle, upward from the first and second sides, 2 and 3, of the body 10, respectively.

The pair of handles 50 included with the body are either integrally formed or formed separately and then attached to the first and second sides, 2 and 3, of the body 10, respectively. In a preferred embodiment, the handles 50 are formed from a single piece of rod 52 or other cylindrical type materials. The rod 52 has a first length 53 that extends approximately 4 inches to a first bend 54, then a second length 55 that extends approximately 4 inches between the first bend 54 and a second bend 56. A third length 57 extends approximately three inches from the second bend 56 to a third bend 58. A hook 60 is then preferably formed or attached to the third bend 58 either directly or via a fourth length 59. These handles 50 are then securely attached to the first and second sides, 2, and 3, of the body 10, respectively. The handles 50 should be attached in an orientation such that the hooks 60 are directed backward, or in the direction of the third short edge 24 and away from the single acute point 13. The handles 50 are adapted to hold bags or other containers that are to be filled with loose materials. Alternately, the handles may be made by cutting or forming hand receiving apertures into the first and second sides 2 and 3, respectively. Hooks 60 may also be formed directly from the body 10, or separately and attached to the sides, 2 and 3, respectively.

The handles 50 are preferably one-piece construction of one quarter inch round steel and are cut into 12 inch pieces. Further, the hooks 60 may be attached or bent at a dihedral angle relative to the rest of the handle 50.

In use, a container, such as a bag, 5 is attached to the pair of hooks 60 with the rear end 4 of the shovel 1 inserted into the mouth of the bag 5. The acute point 13 is thrust into loose materials, such as sand, gravel, soil, leaves, or the like. The point 13 is then brought into an upward direction thereby tilting the tool such that the rear end 4 is lower than the point 13. This allows the loose material to slide down the scoop shape of the shovel 1 and into the bag 5. This is repeated as often as necessary to fill the bag 5. The bag 5 may then be removed from the hooks either by a quick yank or by careful removal from the hooks 60, depending upon the type of bag or container used.

The shovel 1 may have a variety of attachments. A first attachment is a sleeve 80. The sleeve 80 is used to allow the operator to fill structurally rigid containers, such as bucket, boxes, or the like. The sleeve 80 is attached to the rear end 4 of the shovel 1 and a distal end 81 of the sleeve 80 is directed into the rigid container. Thus, the sleeve 80 works as a chute for the loose material into the rigid container. The sleeve 80 can be an open-ended, flattened, tube-like sack made from any flexible or semi-flexible, yet strong material. Preferably, the sleeve 80 is 36 inches long. Preferably, there are two hookup rings 82 made from a hard and durable material, such as plastic. The hookup rings 82 should be approximately ½ inch wide and 1 inch long. The hookup rings 82 are attached to opposite sides of a small end of the sleeve 80 and are used to attach the sleeve 80 to the hooks 60. Alternately, the sleeve 80 may be attached to the shovel 1 by a spring or cord. The cord is a steel or metal spring, rubber band or elastic cord, or any other suitable device or material that can be stretched and will return to its original size upon release. The length of the cord may vary with the chosen size of the container to which the flared end of the sleeve 80 is to be attached. The cord may be a separate piece intended to be used in combination with the sleeve 80, or it may be more permanently attached to the flared end of the sleeve 80. Moreover, the cord may be an integral loop or a length of material with connectors, such as hooks, buckles, or the like, attached at opposite ends thereof.

A handle extension 90 is used to allow the operator an optional method of using the shovel 1. The handles extension 90 has a handle portion 91 with a back handle 92 attached to a first end 93 and a front handle 94 attached to a second end 95 of the handle portion 91. The back handle 92 is oriented along the line of the handle portion 91, and the front handle 94 is oriented perpendicular to the handle portion 91. Two attachment portion 96 extend from the second end 95 of the handle portion 91 at an angle relative to the line of the handle portion 91, i.e., they form a substantially V-shape with the handle portion 91 attached to the vertex of the V-shape. Attachment mechanisms 97 are attached to distal ends of each of the attachment portions 96, respectively. The attachment mechanisms 97 are adapted to removably attach the handle extension 90 to the pair of handles 50 of the shovel 1. Thus, when the handle extension 90 is attached to the shovel 1, it may be used in a manner or fashion similar to that of a conventional shovel.

An alternate embodiment of the present invention is designed for use with light loose materials, such as leaves. In this embodiment the seven-sided body 10 is sheared across a front end, at a position immediately in front of the pair of handles 50 to provide a front edge 26. Further, the bottom of the shovel 1 is flatter to allow this embodiment to be guided and slid along the ground or other flat surfaces. This embodiment is typically sized larger to accommodate larger bags or other containers.

This shovel 1 can be constructed from various forms of material, including metal, plastic, or the like. However, the size may be varied based on the chosen task of the user. A smaller version, made from plastic and sized for a child, is also envisioned as a beach toy for children.

It is envisioned that the tool of the present invention may be used to gather loose materials such as sand, gravel, rocks, leaves, soil, ash from fireplaces, or the like. While these descriptions directly describe the above embodiments, it is understood that those skilled in the art may conceive modifications and/or variations to the specific embodiments shown and described herein. Any such modifications or variations that fall within the purview of this description are intended to be included therein as well. It is understood that the description herein is intended to be illustrative only and is not intended to be limitative. Rather, the scope of the invention described herein is limited only by the claims appended hereto.

What is claimed is:

1. A device for collecting loose material comprising:
A. a body,
   i. said body having a front end, a rear end, and first and second sides,
   ii. said body having
      (a) two long edges that meet at first ends, respectively, to form a single acute point,
      (b) second ends of the two long edges meet first ends of two short edges, respectively, forming a first pair of obtuse points,
      (c) second ends of the two short edges meet first ends of two medium edges, respectively, forming a second pair of obtuse points,
      (d) second ends of the medium edges meet opposite ends of a third short edge, respectively,
      (e) forming a third pair of obtuse points,
         (i) the third short edge is located diagonally across from the single acute point; and
B. a pair of handles, one of each handle located on one of each of the first and second sides, respectively.

2. The device of claim 1 wherein the pair of handles attached to the first and second sides of the body respectively, further comprises a rod with a first length that extends approximately to a first bend, then a second length that extends approximately between the first bend and a second bend, a third length extends approximately from the second bend to a third bend, a hook is then attached to the third bend via a fourth length, the said handles are attached in an orientation such that the hooks are directed in the direction of the third short edge and away from the single acute point.

3. The device of claim 2 further including a sleeve attachment for use in combination with the device, wherein the sleeve attachment is a tube of material and is attachable between the device and a container to be filled, and loose materials are directed from the device, through the sleeve attachment, and into the container.

4. The device of claim 3 further including, in combination as a kit, an extension handle comprising a handle portion with a first end and a second end, a rear handle located at the first end, a front handle located at the second end, at least two attachment portions that project from the second end of the handle portion and having a securing mechanism located at a distal end of each of the at least two attachment portions, whereby the handle portion attaches to the handle of the device by the securing mechanisms.

5. The device of claim 1 wherein the pair of handles attached to the first and second sides of the body respectively, further comprises a pair of apertures adapted to receive human hands and located in the first and second sides, respectively, the body further having a pair of hooks attached adjacent to the handle apertures for securing bags to the device.

6. The device of claim 5 further including a sleeve attachment for use in combination with the device, wherein the sleeve attachment is a tube of material and is attachable between the device and a container to be filled, and loose materials are directed from the device, through the sleeve attachment, and into the container.

7. The device of claim 6 further including, in combination as a kit, an extension handle comprising a handle portion with a first end and a second end, a rear handle located at the first end, a front handle located at the second end, at least two attachment portions that project from the second end of the handle portion and having a securing mechanism located at a distal end of each of the at least two attachment portions, whereby the handle portion attaches to the handles of the device by the securing mechanisms.

8. The device of claim 1 further including a sleeve attachment for use in combination with the device, wherein the sleeve attachment is attachable between the device and a container to be filled, and loose materials are directed from the device, through the sleeve attachment, and into the container.

9. The device of claim 1 in combination with an extension handle comprising:

A. a handle portion with a first end and a second end,
  i. a rear handle located at the first end,
  ii. a front handle located at the second end,
  iii. at least two attachment portions that project from the second end of the handle portion and having a securing mechanism located at a distal end of each of the at least two attachment portions, whereby the handle portion attaches to the handles of the device by the securing mechanisms.

10. A kit for a shovel that is adapted to collect loose materials comprising:

A. a shovel having
  i. a body,
    (a) said body having a front end, a rear end, and first and second sides,
    (b) said body having
      (i) two long edges that meet at first ends, respectively, to form a single acute point,
      (ii) second ends of the two long edges meet first ends of two short edges, respectively, forming a first pair of obtuse points,
      (iii) second ends of the two short edges meet first ends of two medium edges, respectively, forming a second pair of obtuse points,
      (iv) second ends of the medium edges meet opposite ends of a third short edge, respectively, forming a third pair of obtuse points,
        (a) the third short edge is located diagonally across from the single acute point; and
  ii. a pair of handles, one of each handle located on one of each of the first and second sides, respectively, and B. a sleeve for attachment to the shovel and to direct materials into a container.

11. The kit of claim 10 further including a handle extension comprising:

A. a handle portion with a first end and a second end,
  i. a rear handle located at the first end,
  ii. a front handle located at the second end,
  iii. at least two attachment portions that project from the second end of the handle portion and having a securing mechanism located at a distal end of each of the at least two attachment portions, B. whereby the handle portion attaches to the handles of the shovel by the securing mechanisms.

* * * * *